(12) United States Patent
Sanagooy Moharrer

(10) Patent No.: US 10,710,000 B2
(45) Date of Patent: Jul. 14, 2020

(54) VACUUM DISTILLATION APPARATUS

(71) Applicant: PLANET H2O PTY LTD, Port Melbourne (AU)

(72) Inventor: Mohammed Ali Sanagooy Moharrer, Hallam (AU)

(73) Assignee: Planet H2O Pty Ltd., Port Melbourne (AU)

(*) Notice: Subject to any disclaimer, the term of this patent is extended or adjusted under 35 U.S.C. 154(b) by 157 days.

(21) Appl. No.: 15/324,808

(22) PCT Filed: Jul. 7, 2015

(86) PCT No.: PCT/AU2015/050382
§ 371 (c)(1),
(2) Date: Jan. 9, 2017

(87) PCT Pub. No.: WO2016/004475
PCT Pub. Date: Jan. 14, 2016

(65) Prior Publication Data
US 2017/0203228 A1    Jul. 20, 2017

(30) Foreign Application Priority Data
Jul. 8, 2014    (AU) ................ 2014902630

(51) Int. Cl.
*B01D 3/10*    (2006.01)
*B01D 1/06*    (2006.01)
(Continued)

(52) U.S. Cl.
CPC ............. *B01D 3/10* (2013.01); *B01D 1/06* (2013.01); *B01D 1/28* (2013.01); *B01D 3/007* (2013.01);
(Continued)

(58) Field of Classification Search
CPC . B01D 1/06; B01D 1/28; B01D 3/007; B01D 3/10; B01D 3/103; B01D 5/0039;
(Continued)

(56) References Cited

U.S. PATENT DOCUMENTS

| 2,975,107 A | * | 3/1961 | Friedman | ................ | B01D 3/00 |
| | | | | | 203/42 |
| 2,993,480 A | * | 7/1961 | Huet | ..................... | B01D 1/06 |
| | | | | | 122/34 |

(Continued)

FOREIGN PATENT DOCUMENTS

| EP | 0306294 B1 | 11/1992 |
| GB | 1252277 A | 11/1971 |

OTHER PUBLICATIONS

International Search Report for PCT/AU2015/050382, dated Nov. 3, 2015.

*Primary Examiner* — Jonathan Miller
*Assistant Examiner* — Gabriel E Gitman
(74) *Attorney, Agent, or Firm* — Banner & Witcoff, Ltd.

(57) ABSTRACT

A vacuum distillation apparatus for producing treated water from a supply of seed water, the apparatus including: an evaporation chamber for receiving and evaporating the seed water; a heat source for supplying heat to the evaporation chamber; a condensation chamber in fluid communication with the evaporation chamber for receiving and condensing the evaporated seed water; a pressure reducer in communication with the evaporation chamber for promoting evaporation of the seed water; and at least one cooling member disposed within the condensation chamber on which the evaporated seed water can condense, the cooling member being arranged to transfer condensed vapour for collection at a treated water outlet.

18 Claims, 9 Drawing Sheets

(51) Int. Cl.
  *C02F 1/04* (2006.01)
  *B01D 5/00* (2006.01)
  *B01D 1/28* (2006.01)
  *B01D 3/00* (2006.01)
  *C02F 103/08* (2006.01)

(52) U.S. Cl.
  CPC ............ *B01D 3/103* (2013.01); *B01D 5/006* (2013.01); *B01D 5/0039* (2013.01); *C02F 1/041* (2013.01); *C02F 1/046* (2013.01); *C02F 1/048* (2013.01); *C02F 2103/08* (2013.01); *Y02A 20/128* (2018.01); *Y02B 30/52* (2013.01); *Y02W 10/33* (2015.05); *Y02W 10/37* (2015.05)

(58) Field of Classification Search
  CPC .......... B01D 5/006; C02F 1/041; C02F 1/046; C02F 1/048; C02F 2103/08; Y02A 20/128; Y02B 30/52; Y02W 10/33; Y02W 10/37
  See application file for complete search history.

(56) References Cited

U.S. PATENT DOCUMENTS

| | | | | |
|---|---|---|---|---|
| 3,020,215 A | * | 2/1962 | Weber | B01D 1/0017 202/197 |
| 3,096,257 A | | 7/1963 | Foutz | |
| 3,248,305 A | | 4/1966 | Williamson | |
| 3,350,012 A | * | 10/1967 | Choquette, Jr. | B01D 1/0082 236/17 |
| 3,415,721 A | * | 12/1968 | Bie, Jr. | C02F 1/046 202/187 |
| 3,497,422 A | * | 2/1970 | Levite | B01D 3/065 202/173 |
| 3,558,436 A | * | 1/1971 | Foley | C02F 1/16 202/196 |
| 3,654,981 A | * | 4/1972 | Aitchison | B01D 1/223 159/47.1 |
| 4,326,923 A | * | 4/1982 | Mortenson | C02F 1/046 126/561 |
| 4,341,601 A | * | 7/1982 | Hartig | B01D 1/22 203/11 |
| 4,366,030 A | | 12/1982 | Anderson | |
| 4,536,257 A | * | 8/1985 | Atwell | B01D 3/103 202/177 |
| 5,484,510 A | | 1/1996 | Hartman et al. | |
| 5,587,054 A | * | 12/1996 | Keith | B01D 1/2856 159/24.1 |
| 5,630,913 A | * | 5/1997 | Tajer-Ardebili | B01D 3/007 159/901 |
| 5,925,223 A | | 7/1999 | Simpson et al. | |
| 6,303,006 B1 | | 10/2001 | Chang et al. | |
| 7,413,634 B1 | | 8/2008 | Napier | |
| 7,610,768 B2 | | 11/2009 | Lubman et al. | |
| 8,226,799 B1 | * | 7/2012 | Young | B01D 1/305 202/205 |
| 2008/0277263 A1 | * | 11/2008 | Swenholt | B01D 1/28 203/11 |
| 2011/0017583 A1 | * | 1/2011 | Lord | B01D 1/28 202/181 |
| 2012/0037488 A1 | * | 2/2012 | Zebuhr | B01D 1/225 203/4 |
| 2012/0160660 A1 | | 6/2012 | Karlstrom et al. | |
| 2012/0255706 A1 | * | 10/2012 | Tadayon | F28D 20/0039 165/47 |
| 2012/0261250 A1 | | 10/2012 | Mitsufuji | |

\* cited by examiner

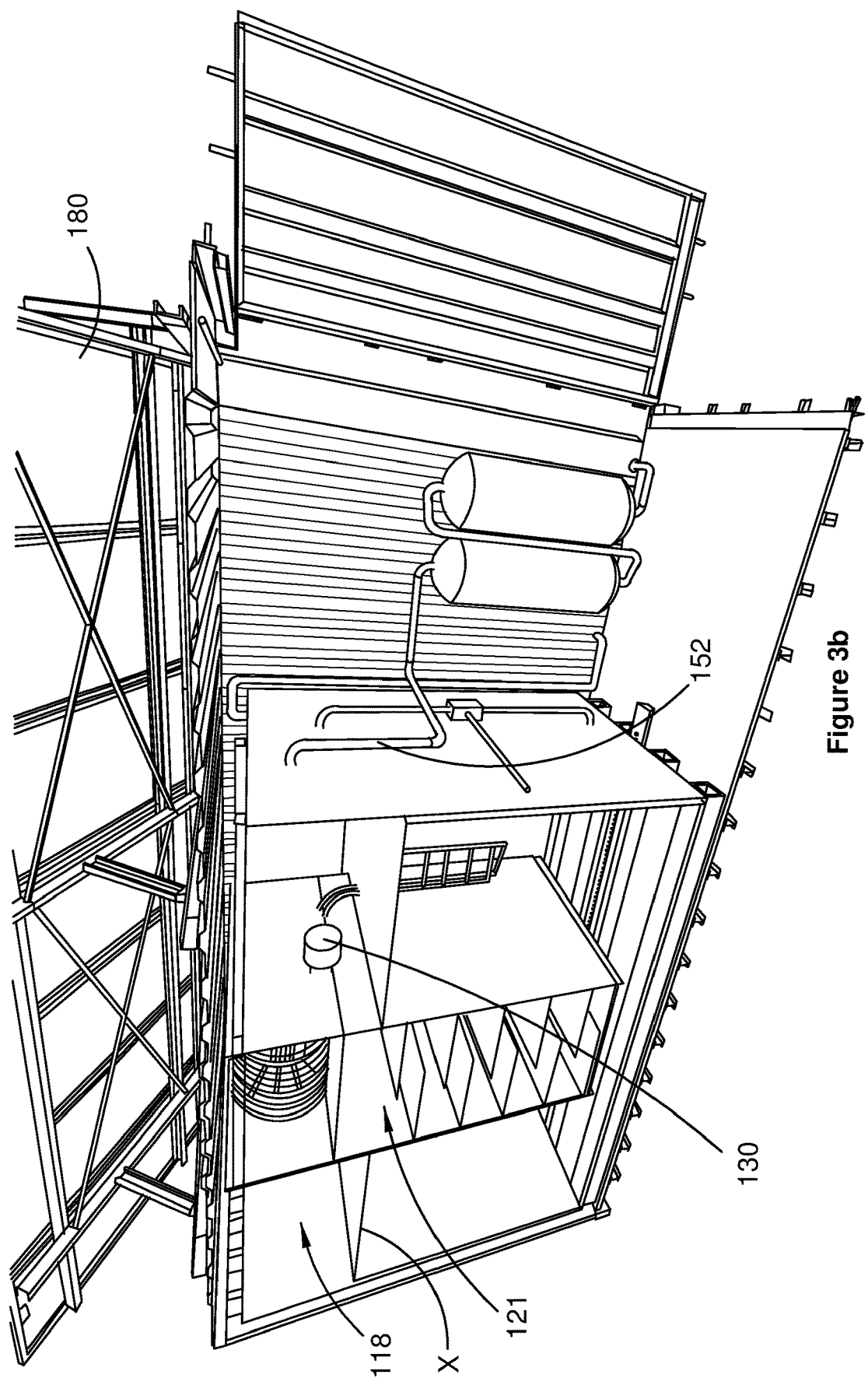

VACUUM DISTILLATION APPARATUS

The application is a U.S. National Phase Entry of International Application No. PCT/AU2015/050382 filed on Jul. 7, 2015, designating the United States of America and claiming priority to Australian Patent Application No. 2014902630 filed on Jul. 8, 2014. The present application claims priority to and the benefit of the above-identified applications and the above-identified applications are incorporated by reference herein in their entirety.

TECHNICAL FIELD

The present invention relates to apparatus for the vacuum distillation of water for the purposes of purification, decontamination, reclamation, or desalination, and other similar treatments. The apparatus is envisaged to find particular use in the purification and reclamation (and subsequent reuse) of, for example, contaminated mine or industrial wastewater, and also in the desalination of sea water and brackish water for the production of potable water.

BACKGROUND OF THE INVENTION

Water is able to be distilled by a process of boiling the water to produce a water vapour. The vapour is substantially free of salt and other contaminants, thus allowing for the subsequent condensation of the vapour to produce a substantially salt-free potable or un-contaminated purified water, leaving a concentrated waste solution (a brine) of salt or other contaminants to be dealt with and removed in an appropriate manner.

The efficiency of such a process can be improved by reducing the pressure above the water to less than its vapour pressure (less than atmospheric pressure), in order to lower the boiling point of the water and thus lower the energy requirements. However, there is of course a balance between the added cost and complexity of operating a system under a vacuum, and the efficiency and cost improvements available through operating at lower temperatures.

Another benefit of such a system is that it permits the introduction of a compressor in the vapour line to increase the pressure of the vapour and thereby increase its temperature, allowing the heat then stored in the vapour to be used as a heat source for the boiling of the water. Indeed, as the heat is extracted from the vapour to boil the water, the vapour can be condensed to release its heat, providing a reasonably energy efficient process for the production and further processing of the purified, decontaminated, reclaimed or potable water.

It is an aim of the present invention to provide an improved vacuum distillation apparatus.

SUMMARY OF THE INVENTION

The present invention provides a vacuum distillation apparatus for producing treated water from a supply of seed water, the apparatus including:
   a distillation tank having a bottom and a top, the distillation tank also having a vacuum evaporation chamber arranged at least partially about a condensation tank;
   a seed water inlet in fluid communication with the evaporation chamber;
   a saturated vapour outlet in fluid communication with the top of the evaporation chamber;
   a vapour line for transferring saturated vapour from the saturated vapour outlet to a compressor for the superheating of the saturated vapour, the vapour line then transferring superheated vapour to an expander at the top of the condensation tank; the condensation tank including a condensation chamber with a treated water reservoir;
   wherein, in use, superheated vapour condenses upon exit from the expander such that condensed water flows down the condensation chamber to the treated water reservoir to form the treated water, and heat transfers from the condensing superheated vapour and condensed water through the condensation tank to the evaporation chamber to heat seed water in the evaporation chamber to form the saturated vapour.

Throughout this specification, the term "seed water" will be used to refer to the supply of water to be treated by the apparatus (the sea water, brackish water, or waste water from mining sites) and the term "treated water" will be used to refer to the water (potable or purified, etc) produced by the apparatus. The term "Total Dissolved Solids" (TDS) is herein used to refer to the amount of any minerals, salts, metals, cations or anions dissolved in water, but not including suspended solids, suspended solids being any particles or substances that are neither dissolved nor settled in the water. Brackish water is said to have an amount of TDS of between 0.5 and 15 grams of salt per litre (ppt), whereas sea water is typically between 15 and 50 grams of salt per litre (ppt), whereas contaminated water can have a level of TDS that exceeds 50 grams per litre (ppt).

As mentioned above, the distillation tank includes a vacuum evaporation chamber arranged at least partially about a condensation tank, ideally allowing for the complete surface area of the condensation tank to be contactable by water and vapour within the evaporation chamber. In one form, the distillation tank is a vertical cylindrical tank and the vacuum chamber is an annular evaporation chamber arranged about a condensation tank in the form of a cylindrical condensation column arranged axially within the evaporation chamber. In this form, the evaporation chamber completely encapsulates the condensation tank to maximise the surface area of the condensation tank in contact with the evaporation chamber.

In another form, the distillation tank is a square or rectangular external tank and the condensation tank is a similarly shaped, but smaller, internal tank, the space between the external and internal tanks thus defining the evaporation chamber. In this form, the condensation tank may only be smaller on two sides, such that the evaporation chamber is actually provided by two chambers, one on either side of the condensation tank. It is this type of arrangement that is envisaged to meet the requirement for the evaporation chamber to be "at least partially about" the condensation tank.

In a preferred form, the evaporation chamber is sized so as to be large enough to permit the treatment of a desired throughput of seed water, but small enough so as to avoid wasting energy on having to heat a large volume of seed water. In this respect, it is envisaged that most embodiments of the apparatus of the present invention will only need the evaporation chamber to have a width in the range of 100 mm to 1000 mm (irrespective of whether the distillation tank is cylindrical or square/rectangular, and irrespective of the height of the apparatus and the relative sizes of the distillation tank and the condensation tank), this width being the distance in the evaporation chamber between the condensation tank and the distillation tank. In a preferred form, this width will be in the range of 200 mm to 600 mm, or more preferably in the range of 200 mm to 400 mm.

Preferably, the distillation tank is open at its bottom and seated within a seed water supply reservoir, with the condensation tank extending substantially the full height of the distillation tank within the evaporation chamber, itself being sealed from the evaporation chamber and having top and bottom walls. The bottom of the distillation tank is thus sealed to atmosphere by the seed water in the reservoir, such that seed water is drawn up inside the lower portion of the evaporation chamber, about the condensation tank, during operation by the vacuum inside the evaporation chamber, creating a seed water column inside the distillation tank. In this form, the seed water inlet is provided by the open end of the bottom of the distillation tank being seated directly within the seed water supply reservoir, and the seed water supply reservoir may be a natural reservoir (such as a lake, a wastewater or tailings pond, or the ocean) or may be supplied with seed water by a pump from a remotely located source of seed water.

In an alternative form, the bottom of the distillation tank may be sealed by a bottom wall of the distillation tank and the seed water may be supplied to the evaporation chamber by any suitable form of seed water inlet, the seed water inlet being located either at the bottom or the top of the evaporation chamber, or at a location somewhere therebetween. In a preferred form though, the seed water inlet will be at the bottom of the evaporation chamber.

In one form of the present invention, the apparatus may include a plurality of heat exchange webs within the distillation tank extending radially from the exterior of the condensation tank, either towards or to, the interior of the distillation tank, or from the interior of the distillation tank, either towards or to, the exterior of the condensation tank. Such webs, which may be in the form of flanges, fins, plates or the like, and which may be straight, curved and or inclined axially or radially, assist with heat transfer from the outer surface of the distillation tank to the seed water, and from the condensation chamber to the seed water. In addition, they can act as a structural support for the distillation tank, assisting with the structural integrity of the distillation tank.

As mentioned above, the apparatus includes a vapour line for transferring saturated vapour from the saturated vapour outlet of the evaporation chamber to a compressor for the superheating of the saturated vapour, the vapour line then transferring that superheated vapour to an expander at the top of the condensation tank. In one form, the compressor may be located at or near the top of the distillation tank, such that it is advantageous to locate the vapour line outside of the distillation tank, minimising the length of the vapour line and reducing the likelihood of condensation commencing in the vapour line (which would occur with a drop in temperature of the vapour, on either side of the compressor) prior to the expander.

In this respect, it will be appreciated that it is preferred for condensation to commence only when the superheated vapour exits the expander at the top of the condensation chamber, in order to maximise the heat available for transfer to the seed water from the condensation tank, and also to maximise the capture of the condensing water (being the treated water). Indeed, it will be appreciated that it is thus preferred for this vapour line to be an insulated vapour line to prevent loss of heat therefrom.

However, it is envisaged that the compressor will be more preferably located at or towards the bottom of the distillation tank in the embodiment where the distillation tank is a vertical cylindrical tank, given that the distillation tank in this embodiment is likely to have a height in the range of 15 m to 20 m or more and it would thus be difficult to support a compressor at the top of such a structure. In this form, the vapour line will run from the top of the distillation tank down its exterior to the compressor at or near the bottom of the distillation tank, returning upwardly to the expander at the top of the condensation tank. In this form, the vapour line may be arranged to run downwardly (to the compressor) externally of the distillation tank, but upwardly (from the compressor) either within the evaporation chamber, within the condensation chamber, or within (as an integral part thereof) one of the walls of the distillation tank or the condensation tank. In one such form, the vapour line may run upwardly within the condensation chamber and may be configured substantially centrally (such as axially) within the condensation chamber, to assist in providing some structural support for the condensation tank.

Superheated vapour condenses upon exit from the expander of the condensation tank such that condensed water flows down the condensation chamber to form the treated water in the treated water reservoir. In one form, the expander is simply the open outlet of the vapour line, the outlet being in the form of an arcuate nozzle directed downwardly into the condensation chamber It will be appreciated that, in all forms, the condensation tank functions as a heat exchanger to permit transfer of heat from the condensing superheated vapour exiting the expander, and the condensed water flowing downwardly in condensation chamber, the heat transfer occurring from the condensation chamber through the wall of the condensation tank to the evaporation chamber to heat the evaporation chamber in order to boil the seed water and form the saturated vapour. The greater portion of this heat transfer will occur towards the top of the apparatus, where the temperature of the condensing superheated vapour is greatest, with the heat transfer reducing down the height of the apparatus.

A benefit of this arrangement is that the vapour above the surface of the seed water is subjected to the higher temperatures, assisting with evaporation from the surface of the seed water without wasting energy in the heating of the bulk of the seed water.

In another preferred form, a plurality of heat exchange webs may also be provided within the condensation chamber, preferably extending radially from the exterior of the vapour line through the condensation chamber towards or to the interior wall of the condensation chamber. Alternatively, such as where the vapour line is not located within the condensation chamber, such webs may extend radially inwardly from the interior wall of the condensation chamber. Such webs, which may be in the form of flanges, fins, plates or the like, and which may be straight, curved and/or inclined axially or radially to assist with the flow of condensed water down the condensation chamber, assist with heat transfer from the superheated vapour to the seed water.

Additionally, such webs may provide support for a vapour line within the condensation chamber, preferably supporting the vapour line axially within the condensation chamber so as to define the condensation chamber as being an annular chamber similar to the preferred form of the evaporation chamber.

In yet another form, at the bottom end of the condensation tank, the vapour line may be arranged to include a "u-tube" or a small tank for the collection of any condensate that forms in the vapour line whilst the apparatus is in start-up mode and is reaching its operating conditions.

The treated water reservoir, being the lower portion of the condensation chamber within which the treated water pools after condensing from the superheated vapour, preferably includes a treated water outlet that perm its removal of treated water from the reservoir. In a preferred form, the treated water outlet is a tube that extends from the condensation tank through the seed water within the evaporation chamber and then through the external wall of the distillation tank at a height above the seed water level. By passing through the seed water, any remaining heat in the treated water is ideally transferred to the seed water to assist in heating that water prior to it being subjected to evaporation of the type mentioned above.

In addition, this configuration of the water outlet tube allows the treated water to act as a valve to prohibit any substance entering the condensation chamber, such as from downstream, permitting the apparatus to operate as an open system without further mechanical valves.

Additionally, within the treated water outlet tube, degassing processes can commence with gases being able to be extracted as they pass through the treated water naturally, being extracted via a venting outlet or an attached granulated carbon filter or like device.

The apparatus of the present invention may also include a heat exchange accelerator. In one form, the heat exchange accelerator can be a water jacket capable of receiving water from the seed water reservoir, the jacket being arranged within, or as a part of, the wall of the distillation tank, in a manner that exposes the exterior of the jacket to the exterior of the distillation tank (and thus the external environment) and the interior of the jacket to the evaporation chamber.

Preferably, the water jacket will be located at or towards the top of the evaporation chamber, where the operating temperatures are highest, to maximise evaporation of this seed water. In this form, water from the seed water reservoir may be pumped through the jacket, not only permitting to heat transfer to this seed water from the evaporation chamber, but also permitting heat to transfer from the exterior of the distillation tank to the circulating seed water, to further assist in heating the seed water.

The water jacket may be in the form of semipermeable material or mesh or helical coil or like material for the purpose of giving resistance to the descending water to enable the change of phase (evaporation) process to occur.

Also in this form of the invention, although also more generally in embodiments where the heat exchange accelerator is not incorporated in the apparatus, the exterior of the distillation tank may include a supplemental heat transfer means for aiding the transfer of heat from the external environment to the evaporation chamber. Such a supplemental heat transfer means may be a series of heat transfer fins or the like, arranged in the normal manner on the exterior surface (either the entire external surface or just a portion of the external surface) of the distillation tank, or may be another configuration of wall surface or shape that acts to increase the external surface area available to be heated.

For example, the external surface may be formed with corrugations rather than with fins. In this respect, it is envisaged that the apparatus of the present invention will often be used in environments where day-time temperatures are quite high (in the range of 30° C. to 45° C.), so it will generally be useful for the energy efficiency of the apparatus to be able to benefit from such high external temperatures in the evaporation of the seed water in the evaporation chamber.

Ideally, where the apparatus includes the heat transfer accelerator referred to above, the distillation tank will include such supplemental heat transfer means at least about that portion of the tank where a water jacket is provided, to directly assist in the heating of seed water circulating through that jacket.

In relation to the seed water reservoir, it will be appreciated that the salt content of the seed water (or the concentration of other contaminants) in that reservoir will increase as evaporation occurs. Accordingly, it will be preferred to continuously extract at least a portion of the seed water from the apparatus, to be replaced with fresh seed water, to ensure that the contaminant content of water in the seed water reservoir does not increase to an undesirable extent. Indeed, in some forms of the invention, it will be necessary to include a solid waste extraction system with a view to removing any precipitated contaminant (such as salt) therefrom that may accumulate at the bottom of the seed water reservoir. Of course, where the apparatus of the present invention is seated directly within a natural reservoir, there is not likely to be a need for such an extraction system.

Indeed, the apparatus of the invention can moderate the rate of processing of the seed water to produce up to nearly 100% solid brine (or waste material). However, this may not be an ideal operating range and it may be preferred to target a recovery of 80% waste material. The extraction system may take the form of an augur, which will extract the waste material from the apparatus, or a suction or pumping device for removal of the waste material for further handling or processing as deemed necessary.

In relation to the compressor, it will be appreciated that the compressor utilised with the apparatus of the present invention may be powered by any suitable energy source. In most forms, it is envisaged that the energy source will be renewable energy source such as a solar powered system. The system can be powered and heated by a number of sources, including but not limited to electricity, environmental heat, solar, heat from an engine, geothermal, natural gas, turbine wind farms, diesel and any other energy or heat source, or waste heat from other processes undertaken at the location of the apparatus.

Finally, while the apparatus of the present invention is a vacuum distillation apparatus, in some circumstances where the outside temperature in a specific location is extremely high, after the initial vacuum is created, it may be possible to reduce the need of the compressor to perform work, while maintaining the vacuum in the condensation chamber, either by reducing the operation of the compressor or by utilising an additional vapour line from the evaporation chamber directly to the condensation chamber to bypass the compressor. It is envisaged that the apparatus can include suitable control devices to monitor and control the operation of the compressor and any bypass lines as necessary.

According to another aspect of the present invention, there is provided a vacuum distillation apparatus for producing treated water from a supply of seed water, the apparatus including:
  an evaporation chamber for receiving and evaporating the seed water;
  a heat source for supplying heat to the evaporation chamber;
  a condensation chamber in fluid communication with the evaporation chamber for receiving and condensing the evaporated seed water;
  pressure reducer in communication with the evaporation chamber for promoting evaporation of the seed water; and
  a plurality of cooling fins disposed within the condensation chamber on which the evaporated seed water can condense, the fins being arranged to transfer condensed vapour for collection at a treated water outlet.

According to a preferred embodiment, the heat source is disposed within the condensation chamber at a location upstream of the means for reducing pressure within the evaporation chamber.

Preferably, the evaporation chamber and the condensation chamber share a common wall to effect heat transfer therebetween.

Preferably, the apparatus further includes a plurality of heating fins disposed within a base of the condensation chamber. In a preferred embodiment, the heated fins and the cooling fins together form part of a heat pump circuit.

Preferably, the means for reducing pressure within the evaporation chamber is a fan disposed at a bottom of the condensation reservoir, the fan being configured to recirculate vapour into the seed water supply.

According to another aspect of the present invention, there is provided a vacuum distillation apparatus for producing treated water from a supply of seed water, the apparatus including:

an evaporation chamber for receiving and evaporating the seed water;

a condensation chamber disposed within the evaporation chamber and having an open upper end in fluid communication with the evaporation chamber for receiving the evaporated seed water; and a pressure reducer in communication with the evaporation chamber for promoting evaporation of the seed water;

wherein a constriction is provided in an upper portion of the condensation chamber to promote condensation of vapour entering the condensation chamber.

In a preferred form, the constriction is an aperture formed in an upper portion of the condensation chamber.

BRIEF DESCRIPTION OF THE DRAWINGS

Having briefly described the general concepts involved with the present invention, a preferred embodiment of an apparatus in accordance with the present invention will now be described. However, it is to be understood that the following description is not to limit the generality of the above description.

In the drawings:

FIGS. 3a and 3b are schematic views of a second preferred embodiment of apparatus in accordance with the present invention, the schematic views being from one side (FIG. 3a) and in perspective from the other side (FIG. 3b).

DETAILED DESCRIPTION OF THE DRAWINGS

Figure 1A:
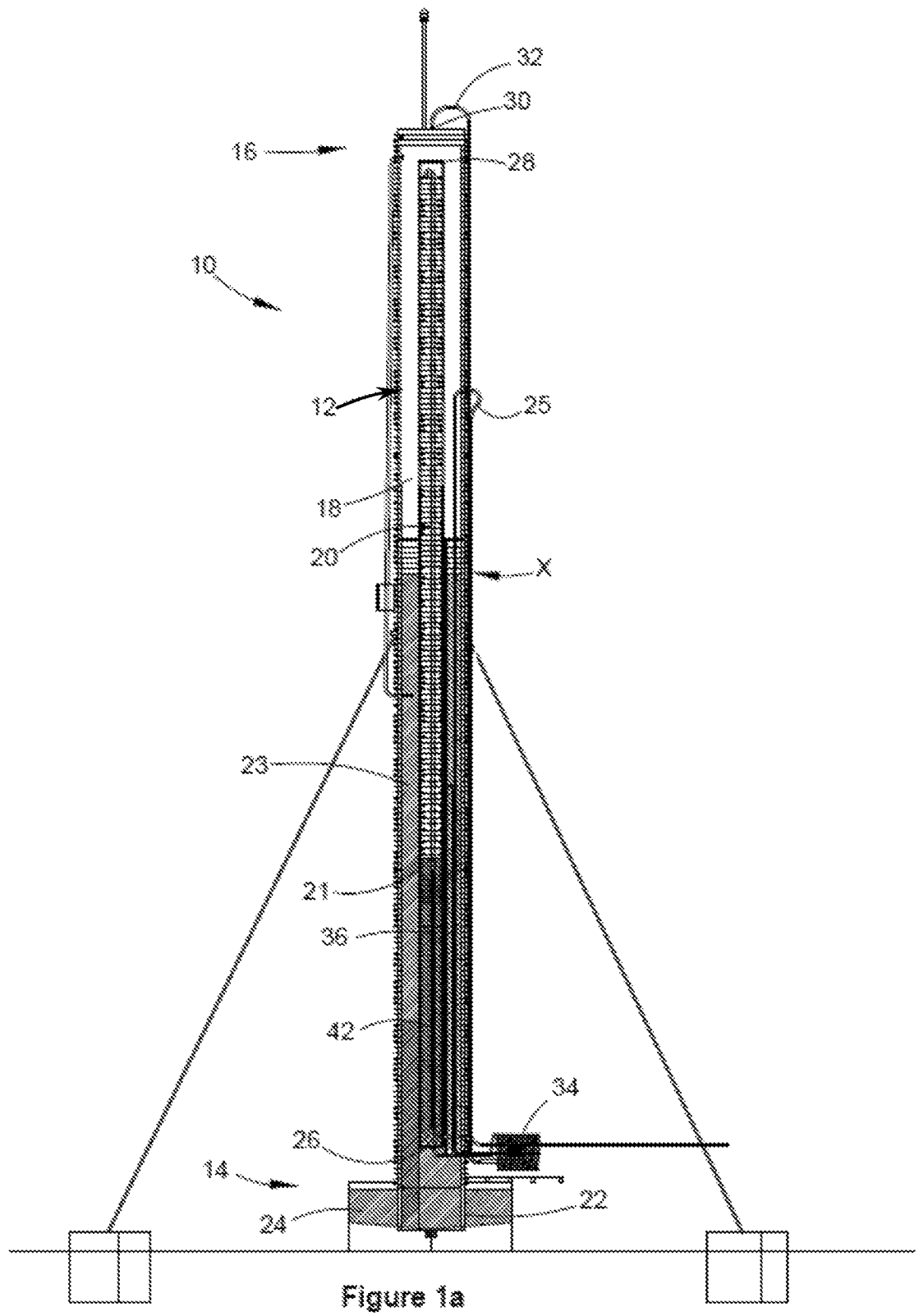
FIGS. 1a and 1b are schematic views of a first preferred embodiment of apparatus in accordance with the present invention, the schematic views being from the side (FIG. 1a) and in perspective from above (FIG. 1b)
Figure 1B:
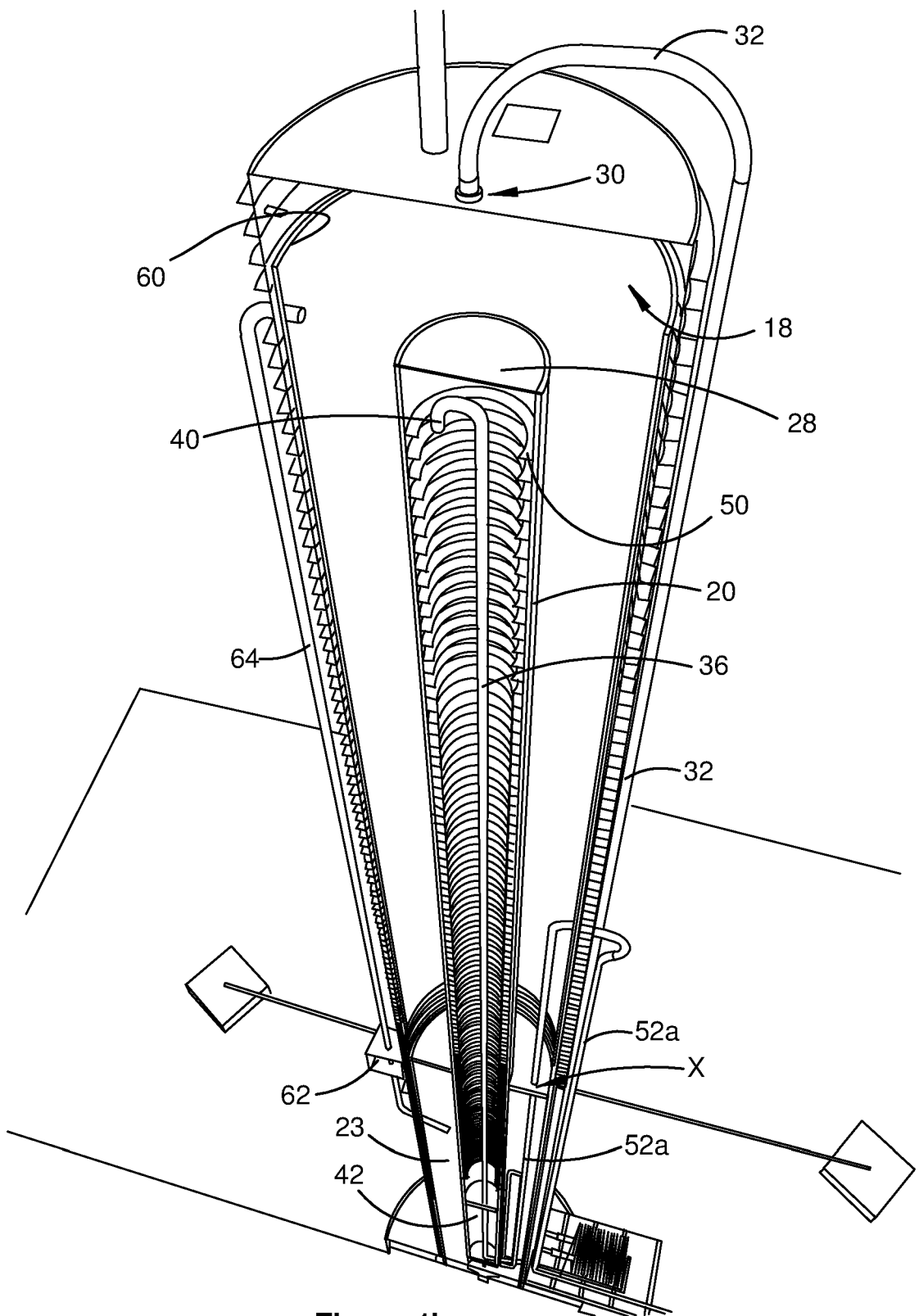
Figure 2A:
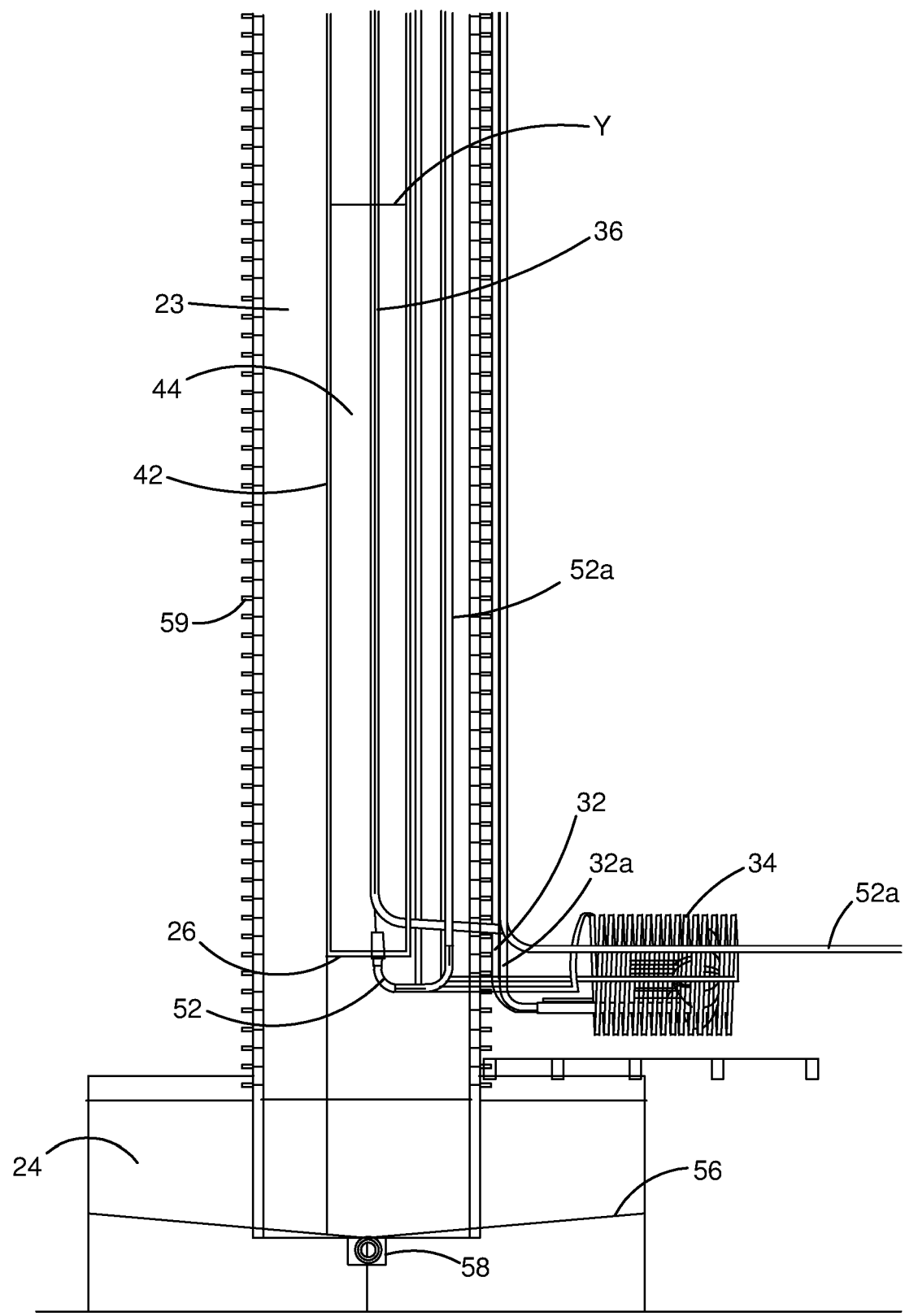
FIGS. 2a, 2b and 2c are partial section views showing the lower portion (FIG. 2a), the middle portion (FIG. 2b) and the upper portion (FIG. 2c) of the first embodiment of FIGS. 1a and 1b.
Figure 2B:
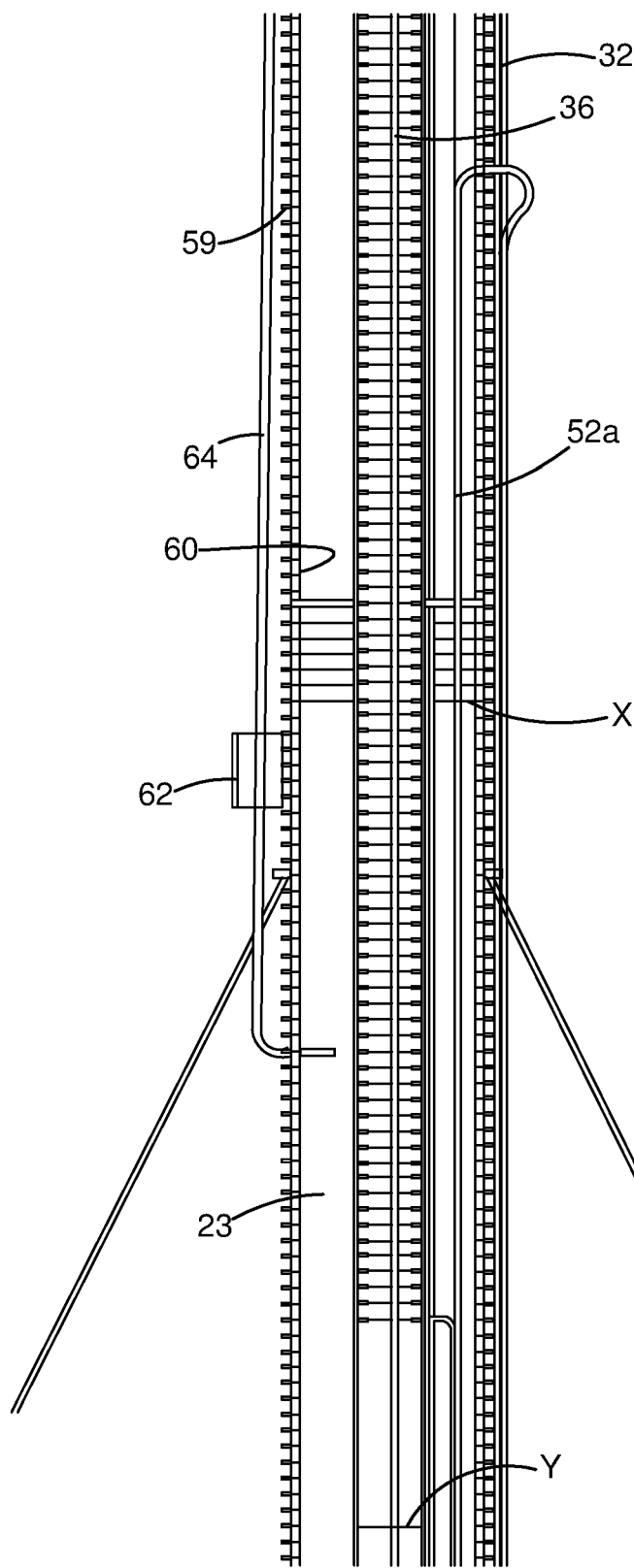
Figure 2C:
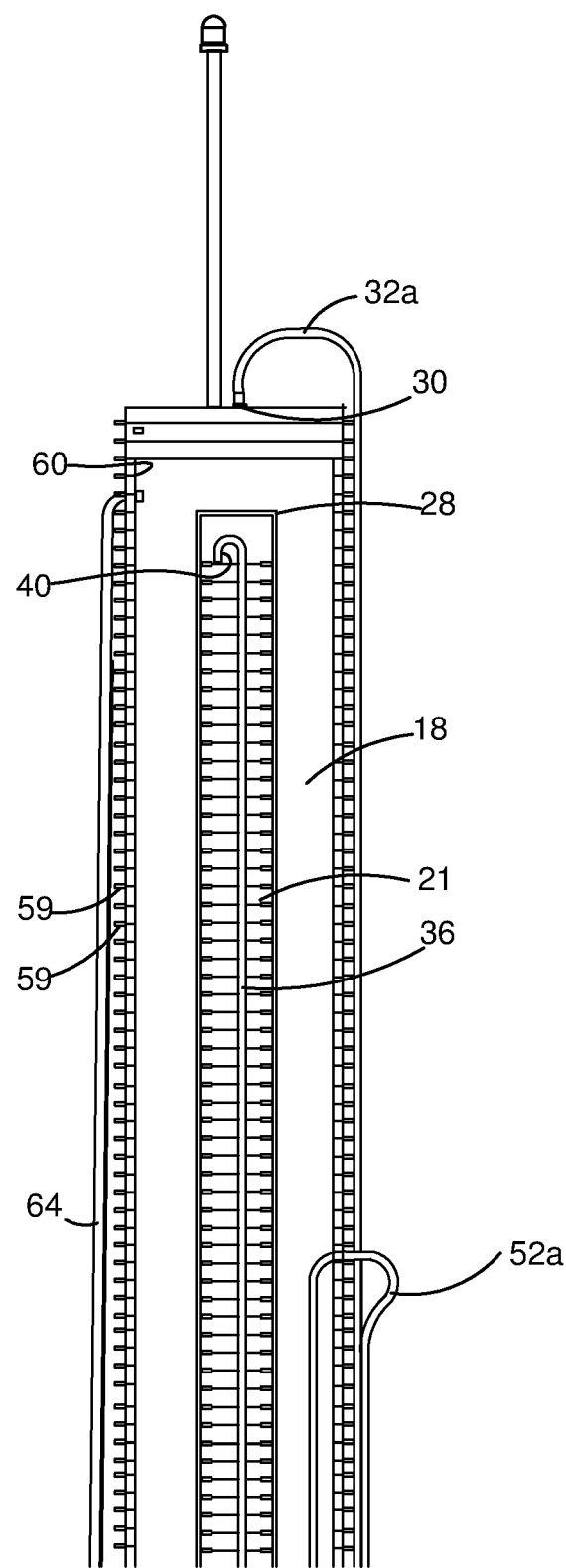

Referring to FIGS. 1a, 1b, 2a, 2b and 2c, a first preferred embodiment of the vacuum distillation apparatus 10 of the present invention includes a distillation tank 12 having a bottom 14 and a top 16, the tank 12 in this embodiment being a vertical cylindrical tank. The distillation tank 12 has a vacuum evaporation chamber 18 arranged about a condensation tank 20, the condensation tank 20 itself being a cylindrical column that is centrally arranged within the tank 12 so as to lie coaxially with the tank 12. In this embodiment, it can thus be seen (more clearly in FIG. 1b) that the evaporation chamber 18 is an annular chamber arranged about the axial condensation tank 20.

The apparatus 10 also includes a seed water inlet 22 in fluid communication with the evaporation chamber 18. The tank 12 is open at its bottom 14 and is shown seated within a seed water supply reservoir 24, with the condensation tank 20 extending substantially the full height of the tank 12 within the evaporation chamber 18. Indeed, the condensation tank 20 is shown as being sealed from the evaporation chamber 18 by a top wall 28 and a bottom wall 26. The bottom of the tank 12 is thus sealed to atmosphere by the seed water in the reservoir 24, such that seed water, during operation of the apparatus 10 (under vacuum) is drawn up inside the tank 12, in the evaporation chamber 18 and about the condensation tank 20, by the vacuum inside the evaporation chamber 18, to form a column 23 of height X determined by the size of the tank 12 and the degree of vacuum within the chamber 20. In this respect, where the height of the tank 12 is in the range of 15 m to 20 m (which is likely), the height X of the seed water in the tank 12 is not likely to be higher than 10.3 m, the maximum being due to the natural head of water able to be supported under normal conditions of atmospheric pressure when subjected to suction.

The apparatus 10 also includes a saturated vapour outlet 30 in fluid communication with the top 16 of the evaporation chamber 18, and a vapour line 32 for transferring saturated vapour from the outlet 30 to a compressor 34, situated at the bottom of the apparatus 10 in this embodiment, for the superheating of the saturated vapour exiting the evaporation chamber 18. As can be seen, the vapour line 32 then continues via vapour line 32a to transfer superheated vapour from the compressor 34 to the bottom of the condensation tank 20.

In this embodiment, the condensation tank 20 includes a condensation chamber 21 together with an internally configured extension 36 of the vapour line 32,32a within the condensation chamber 21 that allows flow of superheated vapour from the bottom to the top of the condensation column 20. The vapour line extension 36 is shown located substantially centrally within the condensation chamber 21, albeit slightly offset within the chamber 21 so as not to be precisely axially arranged. In this embodiment, the condensation tank 20 functions as a heat exchanger to permit transfer of heat from the condensing superheated vapour exiting the expander 40, and from the condensed water flowing down the condensation chamber 21, through the condensation chamber 21 and through the wall of the condensation tank 20 to the evaporation chamber 18 to heat the evaporation chamber 18 in order to boil at least the surface of the seed the water and form saturated vapour rising in the evaporation chamber 18 to exit the evaporation chamber 18 via the saturated vapour outlet 30.

At the top of the vapour line extension 36 there is shown an expander 40 that is simply an extension of the vapour line extension 36, of the same diameter, in the form of a downwardly directed arcuate outlet. Once the superheated vapour has travelled the full extent of the vapour line extension 36, without losing any energy due to the vapour line extension ideally being an insulated line, the vapour exiting the expander 40 returns to being a saturated vapour that is ready to condense purified water droplets, commencing a temperature decrease at the top of the condensation chamber 21, which continues down the length of the condensation chamber 21 as heat is transferred to the evaporation chamber. This results in condensed water flowing down the condensation chamber 21 to pool as treated water in the bottom portion 42 of the condensation chamber 21, the bottom portion 42 thus forming the treated water reservoir 44 mentioned above.

In this embodiment, the distillation tank 12 has a height of 20 m and a diameter of 3 m. The condensation column 20 has a diameter of 2 m and a height of 16 m, noting that the condensation column 20 is configured within the evaporation chamber 18 so that its bottom and top walls (26,28) are arranged about 2 m away from the bottom and top (respectively) of the distillation tank 12. In this form, the seed water height X will generally lie in the range of 9 m to 10 m, depending upon various of the operating parameters, and the height Y of the treated water in the treated water reservoir 44 will generally lie in the range of 2 m to 5 m. Ideally, this will result in the width of the annular evaporation chamber being about 0.5 m.

This first embodiment of the apparatus 10 also includes a plurality of heat exchange webs within the condensation tank 20, extending radially from the interior of the wall of the condensation tank 20 towards the vapour line extension 36 through the condensation chamber 21. Such webs, which are shown in the form of radially projecting fins 50, assist with increasing the amount of heat transfer, as the condensate flows down the condensation chamber 21.

The treated water reservoir 44 includes a treated water outlet 52 that permits removal of treated water from the reservoir 44. The treated water outlet 52 is a tube 52*a* that extends from the condensation tank 20 through the seed water within the annular evaporation chamber 18 through the external wall of the distillation tank 12 at a height above the seed water level X. By passing through the seed water, any remaining heat in the treated water is transferred to the seed water to assist in heating that water prior to it being subjected to evaporation of the type mentioned above.

The seed water reservoir 24 is shown with inclined bottom walls 56 forming part of a solid waste extraction system that also includes an auger 58 for use in extracting solid waste from the apparatus 10. In this respect, it will be appreciated that the salt content of the seed water (or the concentration of other contaminants) in that reservoir will increase as evaporation occurs. Accordingly, it is advisable to continuously extract at least a portion of any precipitated contaminant (such as salt) from the apparatus 10 that may accumulate at the bottom of the seed water reservoir 24.

The exterior of the distillation tank 21 includes a supplemental heat transfer means for aiding the transfer of heat from the external environment to the evaporation chamber 18. Such a supplemental heat transfer means is shown in the Figures as a series of heat transfer fins 59 arranged on the exterior surface of the distillation tank 12.

The distillation tank 21 also includes a heat exchange accelerator in the form of a water jacket 60 configured about the interior wall of the distillation tank 21 in the form of a mesh interior lining. The water jacket 60 is capable of receiving water from the seed water reservoir via a pump 62 and a circulating water line 64. Seed water may thus be pumped directly from the seed water reservoir 24 to the top of the evaporation chamber 18 and dribbled over the water jacket as it flows downwardly. This circulating water is thus exposed to the higher temperatures toward the top of the evaporation chamber 18, plus any increased heat that arises due to the external exposure of the distillation tank 21 to the external weather conditions, adding to the amount of evaporation occurring in the evaporation chamber 18.

Finally, in relation to the compressor 34 of the first embodiment, it will be appreciated that the compressor 34 may be powered by any suitable energy source. However, in most embodiments, it is envisaged that the energy source will be renewable energy source such as a solar powered system.

Although illustrated and described as having the evaporation chamber 18 surrounding the condensation chamber 20, it will be appreciated that this order can be reversed so that the evaporation chamber 18 is disposed within the condensation chamber 20, which allows heat from the condensation chamber 20 to be passed to the evaporation chamber 18 to increase the efficiency of the apparatus 10.

Figure 3A:
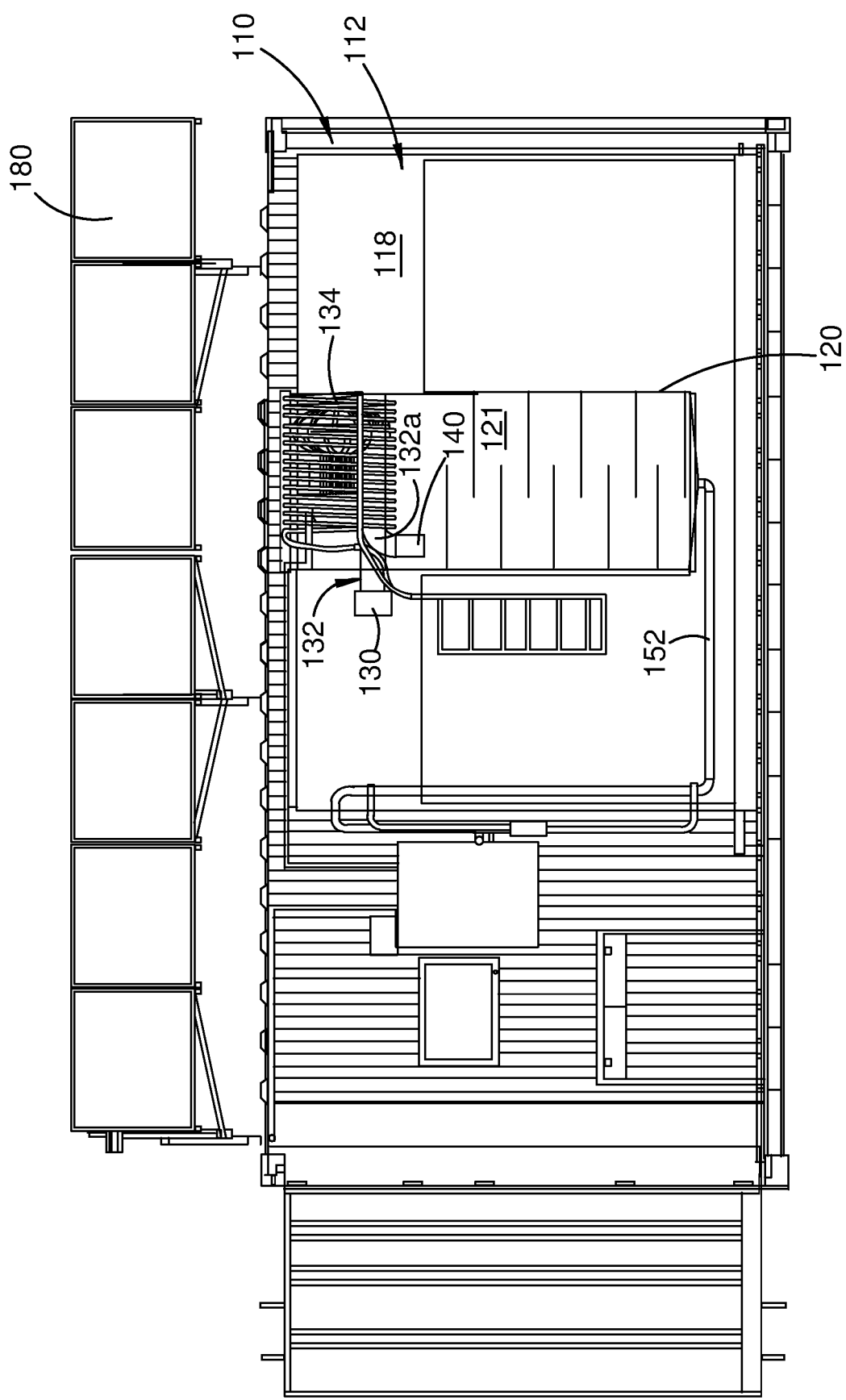

Referring to FIGS. 3*a* and 3*b*, a second preferred embodiment of the vacuum distillation apparatus 110 of the present invention includes a distillation tank 112 in the form of a rectangular tank. The distillation tank 112 has a vacuum evaporation chamber 118 arranged about a condensation tank 120, the condensation tank 120 itself being a square column that is centrally arranged within the tank 112. In this embodiment, it can thus be seen that the evaporation chamber 118 is only partially about the condensation tank 120, there being contact from within the evaporation chamber 118 with two sides and the bottom of the condensation tank 120.

Due to its smaller size and modular nature, the apparatus 110 is envisaged to operate as a batch system. As a result, the seed water inlet is merely the provision of access to the evaporation chamber 118 to add a suitable amount of seed water thereto. While one could be provided, there is thus no permanent fixture shown in FIGS. 3*a* and 3*b* that is a seed water inlet.

The apparatus 110 also includes a saturated vapour outlet 130 in fluid communication with the evaporation chamber 118, and a vapour line 132 for transferring saturated vapour from the outlet 130 to a compressor 134, situated at the top of the apparatus 110 in this embodiment, for the superheating of the saturated vapour exiting the evaporation chamber 118. As can be seen, the vapour line 132 is short and continues via vapour line 132*a* to transfer superheated vapour from the compressor 134 to the condensation tank 120.

The condensation tank 120 includes a condensation chamber 121 and functions as a heat exchanger to permit transfer of heat from the condensing superheated vapour exiting the expander 140, and from the condensed water flowing down the condensation chamber 121, through the condensation chamber 121 and through the wall of the condensation tank 120 to the evaporation chamber 118 to heat the evaporation chamber 118 in order to boil at least the surface of the seed water and form saturated vapour rising in the evaporation chamber 118 to exit the evaporation chamber 118 via the saturated vapour outlet 130.

The expander 140 is simply an extension of the vapour line 132*a*, of the same diameter, in the form of a downwardly directed outlet. The vapour exiting the expander 140 returns to being a saturated vapour that is ready to condense purified water droplets, commencing a temperature decrease at the top of the condensation chamber 121, which continues down the condensation chamber 121 as heat is transferred to the evaporation chamber 118. This results in condensed water flowing down the condensation chamber 121 to pool (not shown in FIGS. 3*a* and 3*b*) as treated water in the bottom portion of the condensation chamber 121, the bottom portion thus forming the treated water reservoir mentioned above, from which treated water is removed via treated water outlet 152.

In this embodiment, the compressor 134 is shown powered by a solar powered system in the form of solar panels 180. Also, the apparatus 110 is shown modularised in a container so that it can be easily transported to a site where, for example, a supply of potable water is needed and there is access to, for example, a supply of salt water as the seed water.

Figure 4:
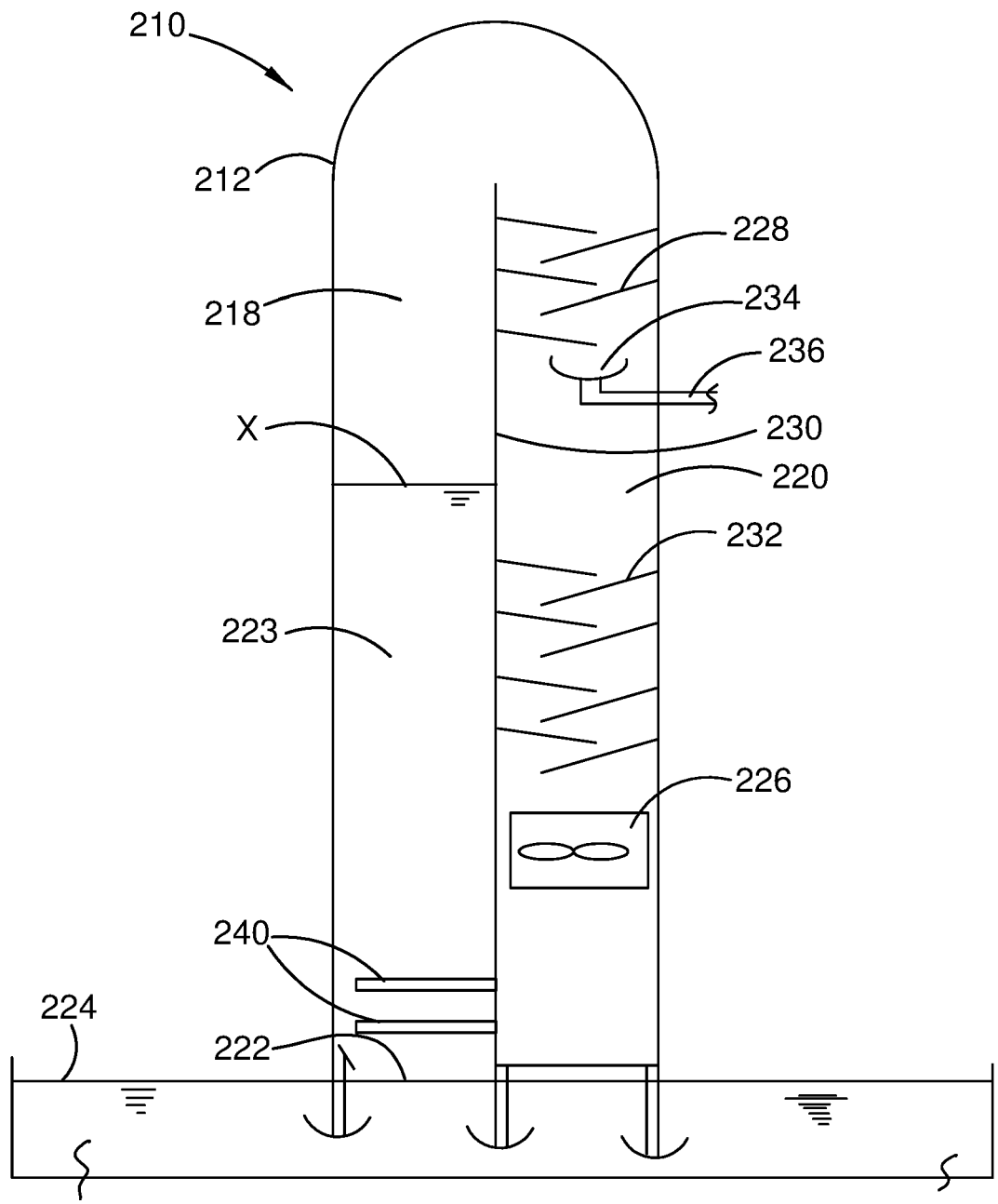
FIG. 4 illustrates a vacuum distillation apparatus according to an embodiment of the invention.

FIG. 4 illustrates a vacuum distillation apparatus 210 according to another embodiment of the invention. The apparatus 210 is configured for use with seed water that is particularly toxic.

The apparatus 210 includes a distillation tank 212 with a vacuum evaporation chamber 218 and a condensation chamber 220. In this embodiment, the apparatus 210 is configured so that the evaporation chamber 218 and the condensation chamber 220 share a common wall 230 to facilitate heat transfer therebetween.

As the vacuum evaporation chamber 218 and the condensation chamber 220 are disposed within distillation tank 212, they are of substantially the same height as the distillation tank 212, with both the condensation chamber 220 and the distillation tank 212 being open to each other at an upper portion thereof so as to be in fluid communication and allow vaporised seed water to flow from the vacuum evaporation chamber 218 to the condensation tank 220.

The apparatus 210 is shown in longitudinal cross section in FIG. 4 with a rounded upper portion. Consistent with this, the apparatus 210 may be cylindrical in lateral cross sections, or the apparatus 210 may have a generally rectangular cross section, either in a generally square or rectangular form.

The apparatus 210 includes a seed water inlet 222 in fluid communication with the evaporation chamber 218. The tank 212 is open at its bottom and is shown seated within a seed water supply reservoir 224 The bottom of the tank 212 is sealed to the atmosphere by the seed water in the reservoir 224, such that during operation of the apparatus 210 (under vacuum) the seed water is drawn up inside the tank 212 to level X in the evaporation chamber 218, by the vacuum inside the evaporation chamber 218, to form a column 223 of height X determined by the size of the tank 212 and the degree of vacuum within the chamber 218. In this respect, where the height of the tank 212 is in the range of 15 m to 20 m (which is likely), the height X of the seed water in the tank 212 is not likely to be higher than approximately 10.3 m, the maximum being due to the natural head of water able to be supported under normal conditions of atmospheric pressure when subjected to suction. In a preferred form, a vacuum of 50% to 90% may be formed in the evaporation chamber 218.

The condensation tank 220 functions as a heat exchanger to permit transfer of heat from the condensing superheated vapour through the wall 230 of the condensation tank 220 to the evaporation chamber 218 to supply heat to the evaporation chamber 218 for heating the seed water to form saturated vapour.

To create a vacuum within the evaporation chamber 218, a means for reducing pressure or suction device is provided. In one form, the suction device is a fan 226 or vacuum pump disposed within the evaporation chamber 218. The fan 226 may be driven by an electric motor, though other forms of drive may be used, depending on the types of energy available at the installation site. It is preferable that the motor and fan 226 be disposed within the evaporation chamber so that heat generated by the motor may be utilised in the evaporation chamber 218, though in other forms, the fan 226 may be disposed remote from the evaporation chamber 218 and in fluid communication via a conduit that opens into a base of the evaporation chamber 218 so as to create a vacuum in evaporation chamber 218.

Within the evaporation chamber 218 is at least one cooling member and at least one heating member. In the illustrated embodiment, the at least one cooling member is a plurality of inclined cooling fins 228 and the at least one heating member is a plurality of inclined heating fins 232. In other forms, the heating/cooling members may be in the form of a plate, mesh or coil. Also, the fins may be in the form of baffles configured to obstruct flow of superheated vapour and may be inclined at an angle consistent with accepted practices in the art. In one example, the fins may be inclined at an angle in the range of 1 to 10 degrees. In a preferred form, the fins are inclined at an angle of 7 degrees. It will be appreciated that the angle of inclination of the cooling fins 228 and the heating fins 232 may be different.

The cooling fins 228 are disposed in an upper half of the condensation chamber 220 and, in use, act to condense the vapour so that a liquid can be collected. As the vapour cools on the surface of the cooling fins 228, condensate or moisture drops form on the fins and, due to the fins being inclined, the moisture travels along the fins and into a collection point 234 before passing into a conduit 236 for transportation as treated water. As illustrated in FIG. 4, the cooling fins 228 are each of a sufficient length so as to be overlapping so that condensate flows from an upper fin onto a lower fin.

The heated fins 232 are disposed below collection point 234 and upstream of the fan 226 and act to heat or superheat the remaining uncondensed vapour in the apparatus before it is returned to the seed water 224 through conduits 240 in fluid communication with the evaporation chamber 218 to heat the seed water 224 and encourage evaporation. Within conduits 240 there are preferably check valves configured to let vapour pass into the seed water 224 only when a predetermined pressure has been exceeded, and to prevent return flow of untreated water into the condensation chamber 220.

In a preferred form, the cooling fins 228 may be in thermal communication with an evaporator of a heat pump, and the heating fins 232 may be in thermal communication with a condenser of a heat pump, preferably the same heat pump. In such an arrangement, heat loss can be minimised as excess heat is captured for reuse in other areas of the apparatus for maximising the efficiency of the generation of treated water. In this heat pump, the working fluid may be carbon dioxide or nitrogen.

In preferred embodiments, the distillation tank 212 (and thus the evaporation chamber 18 and the condensation tank 220) have a height in the range of 5 to 100 m. In one example, the distillation tank 212 has a height of approximately 20 m and is circular in cross section with a diameter of 3 m. Wall 230 is arranged to extend within 2 meters of an apex of the tank 212. In this form, the seed water height X will generally lie in the range of 5.5 m to 10.3 m, depending upon various of the operating parameters.

Near to or in a base of the evaporation chamber 218, an auger may be provided for use in extracting solid waste from the apparatus 210. In this respect, it will be appreciated that the salt content of the seed water (or the concentration of other contaminants) in that reservoir will increase as evaporation occurs. Accordingly, it is advisable to continuously extract at least a portion of any precipitated contaminant (such as salt) from the apparatus 210 that may accumulate at the bottom of the seed water reservoir 224. In addition, a debris filter may also be provided to remove solid debris from the seed water supply 224 before passing into the evaporation chamber 218.

The exterior of the distillation tank 212 may include a supplemental heat transfer means for aiding the transfer of heat from the external environment to the evaporation chamber 218. Such a supplemental heat transfer means may be in the form of a series of heat transfer fins arranged on the exterior surface of the distillation tank 212.

The distillation tank 212 may also include a heat exchange accelerator in the form of a water configured about the interior wall of the evaporation chamber 218 in the form of a mesh interior lining. The water jacket is capable of receiving water pumped from the seed water reservoir and dribbled over the water jacket as it flows downwardly. This circulating water is thus exposed to the higher temperatures toward the top of the evaporation chamber 218, plus any increased heat that arises due to the external exposure of the distillation tank 212 to the external weather conditions, to preheat the seed water, thereby adding to the amount of evaporation occurring in the evaporation chamber 218.

It will be appreciated that the apparatus 210, particularly fan 226 may be powered by any suitable energy source. However, in most embodiments, it is envisaged that the energy source will be renewable energy source such as a solar powered system.

Apparatus 210 also includes a gas extraction vent to reduce pressure build up in the condensation chamber by venting gas to the atmosphere to maintain pressure within the apparatus below a predetermined level. The gas extraction valve may be disposed near outlet 236. An additional pump or fan may be provided in fluid communication with the gas extraction vent for extracting vapour.

Figure 5:
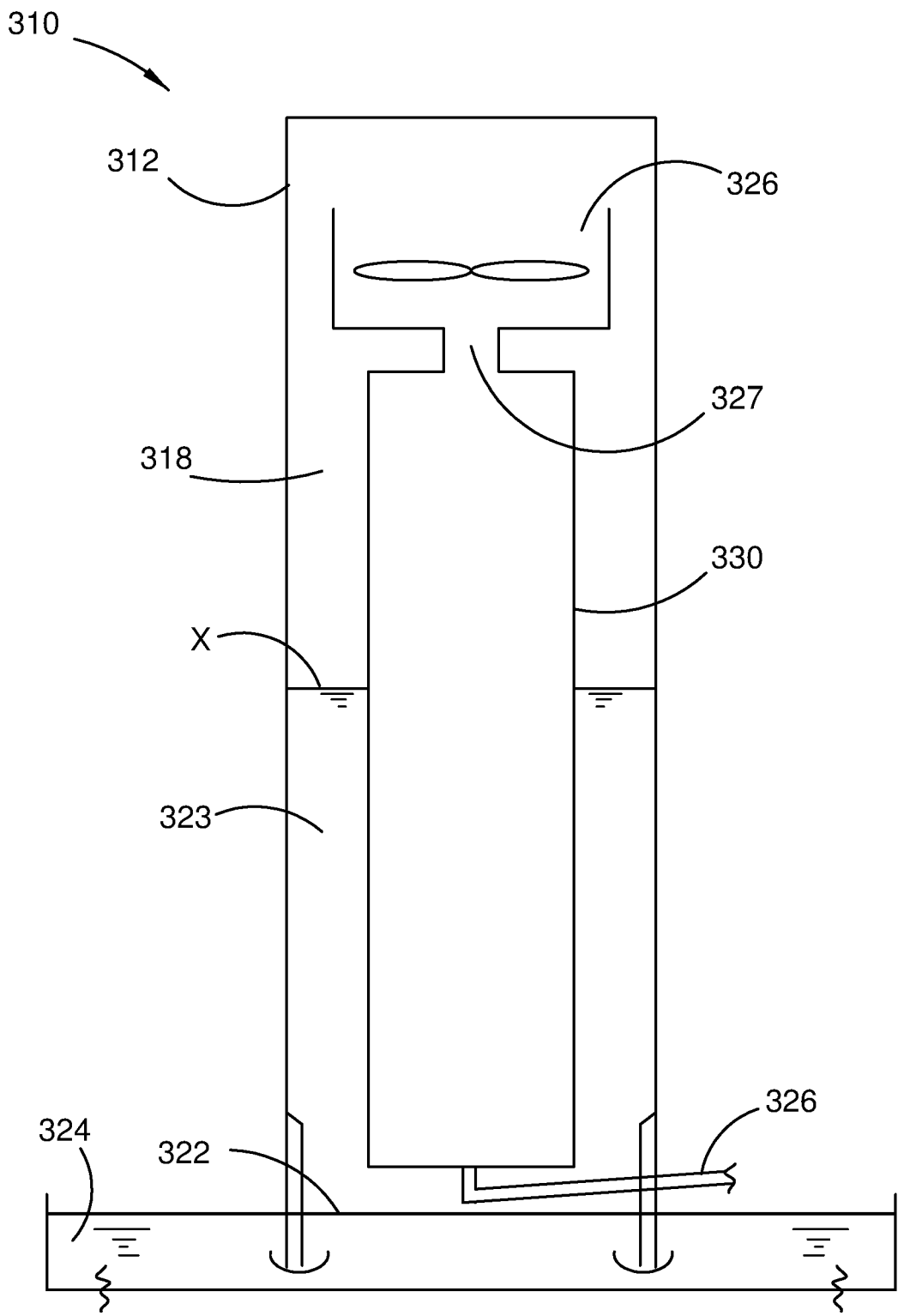
FIG. 5 illustrates a vacuum distillation apparatus according to another embodiment of the invention.

FIG. 5 illustrates a vacuum distillation apparatus 310 according to another embodiment of the invention. The apparatus 310 includes a distillation tank 312 with a vacuum evaporation chamber 318 and a condensation chamber 320. In this embodiment, the apparatus 310 is configured so that the evaporation chamber 318 surrounds the condensation chamber 320 to facilitate heat transfer therebetween. In this regard, condensation chamber 320 is disposed within the evaporation chamber 318 and the evaporation chamber 318 and condensation chamber 320 are concentric cylinders, though it will be appreciated that concentricity is not essential to this embodiment. It will also be appreciated that the evaporation chamber 318 may only extend partially around the condensation chamber 320, for example as a partial cylinder.

Heat may be added to the vacuum evaporation chamber 318 through many means, preferably using waste heat that is readily available. In one example, heat from a motor driving fan 326 is used and, in such an example, steam may be used to lubricate the motor and fan. In another, solar heat energy is used to heat the seed water, either using a combination PV electric/heat cell or a solar collector. Internally plumbed heating coils may also be used, as well as coal or diesel combustion or through devices that create friction.

As the condensation chamber 320 is disposed within the vacuum evaporation chamber 318, it necessarily has a lower height, though the height difference is preferably minimised. The evaporation chamber 318 and the condensation chamber 320 are open to each other at an upper portion thereof so as to be in fluid communication and allow vaporised seed water to flow from the vacuum evaporation chamber 318 to the condensation tank 320.

The apparatus 310 is preferably cylindrical in lateral cross sections, thought the apparatus 310 may have a generally rectangular cross section, either in a generally square or rectangular form.

The apparatus 310 includes a seed water inlet 322 in fluid communication with the evaporation chamber 318. The tank 312 is open at its bottom and is shown seated within a seed water supply reservoir 324 The bottom of the tank 312 is sealed to the atmosphere by the seed water in the reservoir 324, such that during operation of the apparatus 310 (under vacuum) the seed water is drawn up inside the tank 312 to level X in the evaporation chamber 318, by the vacuum inside the evaporation chamber 318, to form a column 323 of height X determined by the size of the tank 312 and the degree of vacuum within the chamber 318. In this respect, where the height of the tank 312 is in the range of 15 m to 20 m (which is likely), the height X of the seed water in the tank 212 is not likely to be higher than approximately 10.3 m, the maximum being due to the natural head of water able to be supported under normal conditions of atmospheric pressure when subjected to suction. In a preferred form, a vacuum of 50% to 90% may be formed in the evaporation chamber 318.

As the evaporation chamber 318 and the condensation tank 320 share a common wall 330, heat from the condensation chamber 320 can be transferred to the evaporation chamber 318 for heating the seed water to form saturated vapour.

To create a vacuum within the evaporation chamber 318, a means for reducing pressure or suction device is provided. In one form, the suction device is a fan 326 or vacuum pump disposed within the evaporation chamber 318 in an upper portion thereof. The fan 326 may be driven by an electric motor, though other forms of drive may be used, depending on the types of energy available at the installation site. It is preferable that the motor and fan 326 be disposed within the evaporation chamber so that heat generated by the motor may be utilised in the evaporation chamber 318, though in other forms, the fan 326 may be disposed remote from the evaporation chamber 318 and in fluid communication via a conduit that opens into a base of the evaporation chamber 318 so as to create a vacuum in evaporation chamber 318.

Downstream of fan 326 is a constriction 327 that serves to promote condensation within the condensation chamber 320. Low pressure vapour passing through the fan speeds up to pass through the constriction 327 before slowing and increasing in pressure of the vapour to promote condensation, in a manner similar to that of a condenser or an expansion valve.

In one example, the evaporation chamber 318 has a height of 20 m and the condensation tank 320 has a height of approximately 18 m and is circular in cross section with a diameter of 3 m. In this form, the seed water height X will generally lie in the range of 9 m to 10 m, depending upon various of the operating parameters. To ensure sufficient heat transfer from the condensation chamber to the column of water 323, the water height is preferably 7 m.

Near to or in a base of the evaporation chamber 318, an auger may be provided for use in extracting solid waste from the apparatus 310. In this respect, it will be appreciated that the salt content of the seed water (or the concentration of other contaminants) in that reservoir will increase as evaporation occurs. Accordingly, it is advisable to continuously extract at least a portion of any precipitated contaminant (such as salt) from the apparatus 310 that may accumulate at the bottom of the seed water reservoir 324. In addition, a debris filter may also be provided to remove solid debris from the seed water supply 324 before passing into the evaporation chamber 318.

The exterior of the distillation tank 312 may include a supplemental heat transfer means for aiding the transfer of heat from the external environment to the evaporation chamber 318. Such a supplemental heat transfer means may be in the form of a series of heat transfer fins arranged on the exterior surface of the distillation tank 312.

The distillation tank 312 may also include a heat exchange accelerator in the form of a water configured about the interior wall of the evaporation chamber 318 in the form of a mesh interior lining. The water jacket is capable of receiving water pumped from the seed water reservoir and dribbled over the water jacket as it flows downwardly. This circulating water is thus exposed to the higher temperatures toward the top of the evaporation chamber 318, plus any increased heat that arises due to the external exposure of the distillation tank 312 to the external weather conditions, to preheat the seed water, thereby adding to the amount of evaporation occurring in the evaporation chamber 318.

It will be appreciated that the apparatus 310, particularly fan 326 may be powered by any suitable energy source. However, in most embodiments, it is envisaged that the energy source will be renewable energy source such as a solar powered system.

Apparatus 310 also includes a gas extraction vent to reduce pressure build up in the condensation chamber by venting gas to the atmosphere to maintain pressure within the apparatus below a predetermined level. The gas extraction valve may be disposed above fan 326. An additional pump or fan may be provided in fluid communication with the gas extraction vent for extracting vapour.

In the described and illustrated embodiments, to increase the capacity of the apparatus, it will be appreciated that the height of the apparatus may be increased. In situations where a tall object is not desirable, the apparatus may be at least partially buried in the ground. Also, to reduce the height of the water column, a number of apparatuses may be stacked one of top of another. Also, an assembly comprising a plurality of the same or differently configured apparatuses may be provided. An assembly of this type may include apparatuses of different configurations selected from the above described embodiments.

In one example, a system includes an apparatus 210 in combination with an apparatus 310. Each apparatus is in communication, preferably via an operable door between evaporation chambers 218, 318. Such a system would allow seed water to be distilled until a slurry is obtained and dried, making it particularly useful in extracting water from slurries. One particular example of an application for this apparatus is in the manufacture of olive oil and the extraction of water from slurries produced in this manufacture. In use, such slurries could be suspended in filtration bags within the evaporation chamber 218 for initial water extraction before the door opens to allow the slurry to be further dried so as to maximise water extraction.

Those skilled in the art will appreciate that the described embodiments require a source of energy for operation. This energy source may be derived for example from fossil fuels, i.e. the burning of gas, oil or coal. Alternatively, renewable sources such as wind or solar energy may be utilised. In locations that have an abundance of heat, such as a desert, this heat may be used to evaporate the seed water, thereby reducing or eliminating energy needs to run the system. Whether an abundance of external atmospheric heat is available, any of this heat is preferably used for evaporating the seed water to increase the efficiency of the system.

Those skilled in the art will appreciate that the described embodiments have many different applications, such as for example, but not limited to, commercial waste water, removal of chemical contamination from water, extracting water from mining tailings, and cleaning water contaminated by fracking processes. It will also be appreciated that the materials used in the apparatuses, such as stainless steel or plastic, will be selected having regard to accepted practice in the art.

Further examples include providing treated water to remote or unpowered sites, such as those of humanitarian missions or military operations.

The described embodiments may be a fixed structure or may be configured to be portable. For example, embodiments may be configured for tilting so as to be carried on the back of a truck/trailer. Such embodiments may be fixed to truck so as to portable a mobile apparatus that can easily be transported between sites. Embodiments having an open base are easily adaptable to new sites as the apparatus can merely be placed in a water source and operated.

The embodiments have been described by way of example only and modifications are possible within the scope of the invention disclosed.

The invention claimed is:

1. A vacuum distillation apparatus for producing treated water from a supply of seed water, the apparatus including:
   a distillation tank having a bottom and a top, the distillation tank also having a vacuum evaporation chamber arranged at least partially about a condensation tank;
   a seed water inlet in fluid communication with the evaporation chamber;
   a saturated vapour outlet in fluid communication with the top of the evaporation chamber;
   a vapour line for transferring a saturated vapour from the saturated vapour outlet to a compressor for superheating of the saturated vapour, the vapour line then transferring the superheated saturated vapour to an expander at the top the condensation tank; and
   wherein the condensation tank includes a condensation chamber with a treated water reservoir, wherein the treated water reservoir includes a treated water outlet that permits removal of a treated water from the treated water reservoir, and wherein the treated water outlet comprises a conduit that extends from the reservoir through a seed water within the evaporation chamber to exit the distillation tank at a height above a maximum seed water level; and
   wherein, in use, superheated vapour condenses upon exit from the expander such that condensed water flows down the condensation chamber to the treated water reservoir to form the treated water, and heat transfers from the condensing superheated vapour and condensed water to the evaporation chamber to heat the seed water in the evaporation chamber to form the saturated vapour.

2. The vacuum distillation apparatus according to claim 1, wherein the distillation tank is a vertical cylindrical tank and the evaporation chamber is an annular evaporation chamber arranged about a cylindrical condensation tank in the form of a column arranged axially within the evaporation chamber.

3. The vacuum distillation apparatus according to claim 1, wherein the distillation tank is open at its bottom and seated within a seed water supply reservoir.

4. The vacuum distillation apparatus according to claim 1, wherein the bottom of the distillation tank is sealed by a bottom wall of the tank and the seed water is supplied to the evaporation chamber by a seed water inlet.

5. The vacuum distillation apparatus according to claim 4, wherein the seed water inlet is at the bottom of the evaporation chamber.

6. The vacuum distillation apparatus according to claim 1, wherein the distillation tank comprises an external tank having a square or rectangular cross-section and the condensation tank is a similarly shaped, but smaller, internal tank, the space between the external and internal tanks defining the evaporation chamber.

7. The vacuum distillation apparatus according to claim 1, further comprising a plurality of heat exchange webs therewithin, extending radially from the exterior of the condensation tank towards or to the interior of an outer wall of the distillation tank, or from the interior of the outer wall the distillation tank towards or to the exterior of the condensation tank.

8. The vacuum distillation apparatus according to claim 1, wherein the condensation tank is a cylindrical column extending substantially the full height of the distillation tank within the evaporation chamber, the cylindrical column being sealed from the evaporation chamber and having top and bottom walls.

9. The vacuum distillation apparatus according to claim 8, wherein the vapour line from the compressor to the expander is located substantially centrally within the cylindrical column.

10. The vacuum distillation apparatus according to claim 9, wherein the condensation tank includes a plurality of heat exchange webs extending radially from the exterior of the vapour line therewithin through the condensation chamber towards or to the interior of the wall of the cylindrical column, or from the exterior of the vapour line therewithin through the condensation chamber towards or to the interior of the condensation chamber.

11. The vacuum distillation apparatus according to claim 1, wherein the expander is an open outlet of the vapour line, the outlet being in the form of a nozzle directed downwardly into the condensation chamber.

12. The vacuum distillation apparatus according to claim 1, wherein the vapour line includes a u-tube for collection of any condensate to be removed prior to the apparatus reaching an operation temperature.

13. The vacuum distillation apparatus according to claim 1, wherein the distillation tank includes a heat exchange accelerator.

14. The vacuum distillation apparatus according to claim 13, wherein the heat exchange accelerator is a water jacket capable of receiving water from the seed water reservoir, the jacket being arranged within, or as a part of, the wall of the distillation tank, in a manner that exposes the exterior of the jacket to the exterior of the distillation tank and the interior of the jacket to the evaporation chamber.

15. The vacuum distillation apparatus according to claim 14, wherein the water jacket comprises a semipermeable material or mesh or helical coil for the purpose of giving resistance to the descending water to enable the evaporation to occur.

16. The vacuum distillation apparatus according to claim 1, wherein the exterior of the distillation tank includes a supplemental heat transfer means for aiding the transfer of heat from the external environment to the evaporation chamber.

17. The vacuum distillation apparatus according to claim 16, wherein the supplemental heat transfer means is a series of heat transfer fins or corrugations.

18. The vacuum distillation apparatus according to claim 1, including a solid waste extraction system for removing any precipitated contaminant that accumulates at the bottom of the seed water reservoir.

* * * * *